United States Patent
Lutz

(10) Patent No.: US 7,594,563 B2
(45) Date of Patent: Sep. 29, 2009

(54) ROTARY DAMPER RESISTANCE FOR STEERING SYSTEM

(75) Inventor: David G. Lutz, New Holland, PA (US)

(73) Assignee: CNH America LLC, New Holland, PA (US)

( * ) Notice: Subject to any disclaimer, the term of this patent is extended or adjusted under 35 U.S.C. 154(b) by 576 days.

(21) Appl. No.: 11/429,701

(22) Filed: May 8, 2006

(65) Prior Publication Data

US 2007/0257461 A1    Nov. 8, 2007

(51) Int. Cl.
B62D 7/22 (2006.01)
(52) U.S. Cl. .................. 180/402; 180/403; 280/89; 280/90
(58) Field of Classification Search .......... 180/402, 180/403; 280/89, 90
See application file for complete search history.

(56) References Cited

U.S. PATENT DOCUMENTS

| | | | | |
|---|---|---|---|---|
| 4,432,254 A | * | 2/1984 | Schultz | 74/573.1 |
| 4,860,844 A | * | 8/1989 | O'Neil | 180/402 |
| 4,865,144 A | * | 9/1989 | North | 180/402 |
| 5,097,917 A | * | 3/1992 | Serizawa et al. | 180/402 |
| 6,219,604 B1 | * | 4/2001 | Dilger et al. | 701/41 |
| 6,494,471 B2 | * | 12/2002 | Lukac | 280/93.5 |
| 6,557,662 B1 | * | 5/2003 | Andonian et al. | 180/402 |
| 6,712,175 B2 | * | 3/2004 | Kind et al. | 180/402 |
| 6,799,654 B2 | * | 10/2004 | Menjak et al. | 180/402 |
| 6,814,177 B2 | * | 11/2004 | Bohner et al. | 180/402 |
| 6,817,437 B2 | * | 11/2004 | Magnus et al. | 180/403 |
| 6,820,713 B2 | * | 11/2004 | Menjak et al. | 180/402 |
| 6,973,989 B2 | * | 12/2005 | Williams | 180/402 |
| 6,983,816 B2 | * | 1/2006 | Takahashi et al. | 180/402 |
| 7,133,758 B2 | * | 11/2006 | Otto et al. | 701/50 |
| 2002/0157894 A1 | * | 10/2002 | Hjelsand et al. | 180/446 |
| 2003/0230448 A1 | * | 12/2003 | Guldner et al. | 180/402 |
| 2004/0262071 A1 | * | 12/2004 | Duits et al. | 180/402 |

* cited by examiner

Primary Examiner—Lesley D Morris
Assistant Examiner—Michael R Stabley
(74) Attorney, Agent, or Firm—Patrick M. Sheldrake; John William Stader; Michael G. Harms

(57) ABSTRACT

A damping system for a steer-by-wire vehicle steering system that comprises a viscous damper that accepts a rotational input and interconnecting said damper to the steering input shaft in a manner to impart the damping characteristics of rotary damper to the steering wheel.

8 Claims, 5 Drawing Sheets

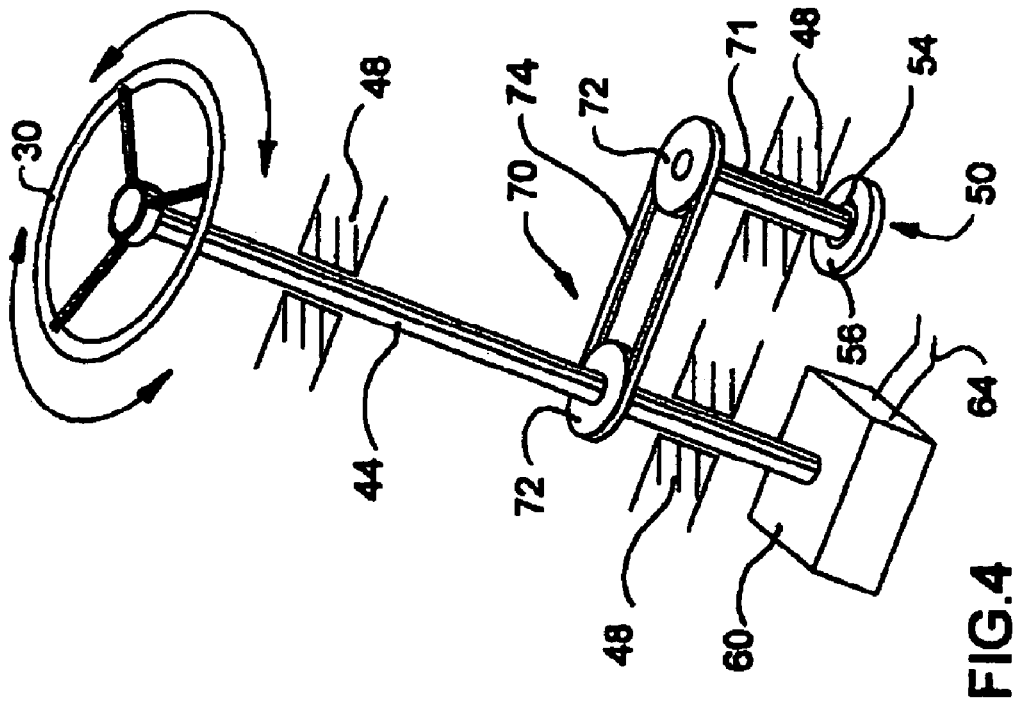
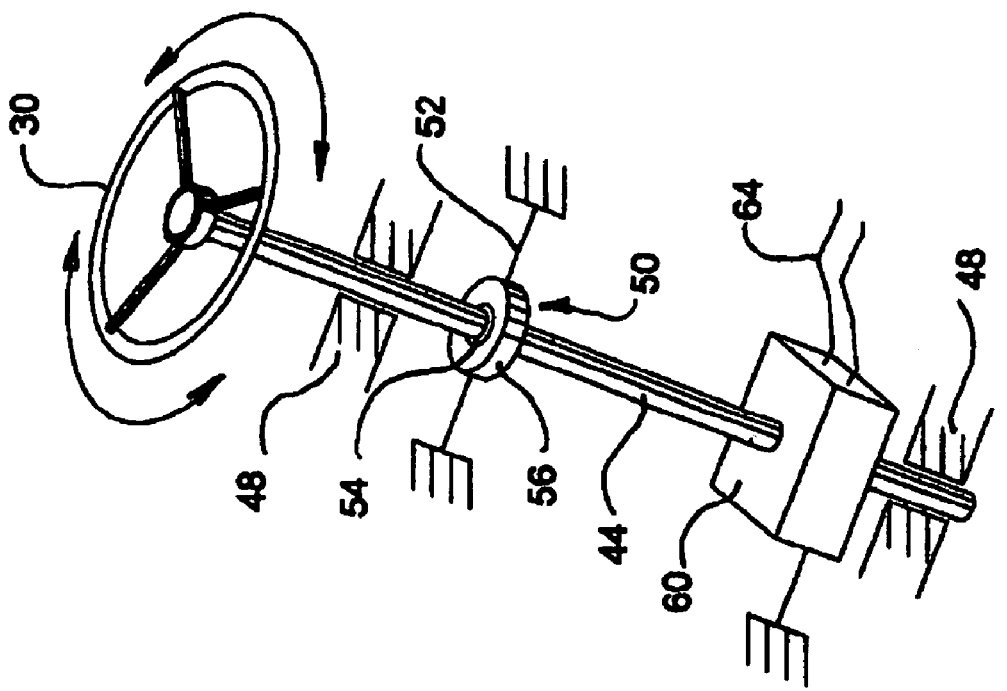

ROTARY DAMPER RESISTANCE FOR STEERING SYSTEM

BACKGROUND OF THE INVENTION

The present invention relates to a steering resistance system for a drive-by-wire vehicle steering system and, more particularly, to a steering resistance system using a viscous damper to impart rotary resistance to the steering wheel in a drive-by-wire vehicle steering system for agricultural and construction vehicles.

Vehicle steer-by-wire systems in construction and agricultural applications are advantageous in that they replace bulky, complicated mechanical steering systems typically located and required to operate in harsh environmental conditions with components that may be located in less severe environments. Typical steer-by-wire systems take operator input in the form of steering wheel rotation and communicate that input to the steered wheels through non-mechanical means. However, eliminating the mechanical linkage between the steering wheel and the steered wheels removes traditional sources to steering wheel movement resistance, such as friction within the steering linkage, and the forces required to reposition the steered wheels. The steering wheel is thus free to rotate with negligible resistance. Without adequate resistance to steering wheel rotation, inadvertent steering inputs may be sensed by the steer-by-wire system caused by vehicle vibration, inadvertent operator movement, or both. Steering wheel resistance is also needed to prevent the operator from providing more steering input than desired in response to normal field conditions when little or no resistance to the input is encountered thereby resulting in a vehicle oversteering condition.

Numerous inventions address the problem of steering wheel feedback through use of complex systems that simulate the steering wheel feel and/or motion traditionally experienced with a conventional mechanical steering linkage. Many of these inventions employ complex systems for sensing reactions at the steered wheels and translating the reactions into steering wheel motions via elaborate motor and resistance units. Such systems are generally intended for automobiles where vehicle speeds dictate that more sensory feedback be provided from the steered wheels. Complex steering wheel feedback systems are expensive, resulting in unnecessary expense in agricultural vehicles. Additionally, complex systems may lack the necessary reliability for agricultural and construction applications; equipment down time, especially during critical harvest times, jeopardizes the crop and represents additional economic disadvantages to the complex systems.

Elaborate steering wheel feedback systems in agricultural and construction are unnecessary and are, in fact, undesirable. Vehicle speeds are comparatively low and the benefit of providing sensory feedback from the steering wheel to the vehicle operator negligible. Adequate steering wheel feel in a steer-by-wire system can be accomplished by adding torsional resistance to the steering wheel to prevent it from freely spinning when turned, such as a friction brake. Friction brakes are disadvantageous because of inherent differences between static and dynamic friction coefficients which result in differing levels of steering wheel resistance during a turning cycle. The vehicle operator initially experiences a high resistance to steering wheel movement followed by lower resistance once steering wheel movement commences. Operator effort to cause initial steering wheel movement can result in greater directional input than is needed or intended once the steering wheel begins to rotate. Correcting such steering inputs increases operator fatigue during vehicle operation which can adversely affect vehicle productivity during critical harvest seasons.

It would be a great advantage to provide a simple damping system to a steer-by-wire steering wheel that provides passive resistance to steering wheel rotation based on the speed of the rotation, avoids complex steering wheel feedback systems, and overcomes the above problems and disadvantages.

SUMMARY OF THE INVENTION

Accordingly, it is an object of the present invention to provide a rotary damper for the steering wheel in a steer-by-wire steering system to provide rotational resistance to the steering wheel to prevent inadvertent steering input caused by machine vibration or inadvertent operator contact with the steering wheel.

It is a further object of the present invention to provide a compact rotary damper for the steering wheel in a steer-by-wire steering system that may be easily incorporated into existing steering column designs of agricultural and construction vehicles.

It is a further object of the present invention to provide a simple rotary damper for the steering wheel in a steer-by-wire steering system that may be interconnected with the steering wheel in a variety of manners, further enhancing the ease by which the invention can be incorporated into existing steering column designs.

It is a further object of the present invention to provide a rotary damper for the steering wheel in a steer-by-wire steering system that enhances the feel of the steering system for the operator.

It is a still further object of the present invention to provide a rotary damper for the steering wheel in a steer-by-wire steering system that minimizes operator fatigue resulting from steering the vehicle.

It is a still further object of the present invention to provide rotary damper resistance to a vehicle steering system that is durable in construction, inexpensive of manufacture, carefree of maintenance, easily assembled, and simple and effective to use.

These and other objects are achieved by providing a viscous damper that accepts a rotational input and interconnecting said damper to the steering input shaft in a manner to impart the damping characteristics of rotary damper to the steering wheel.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is an exploded partial schematic view of a vehicle steering system of the instant invention showing the preferred embodiment;

FIG. 4 is an exploded partial schematic view of a vehicle steering system of the instant invention showing an alternate embodiment;

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail.

Figure 1:
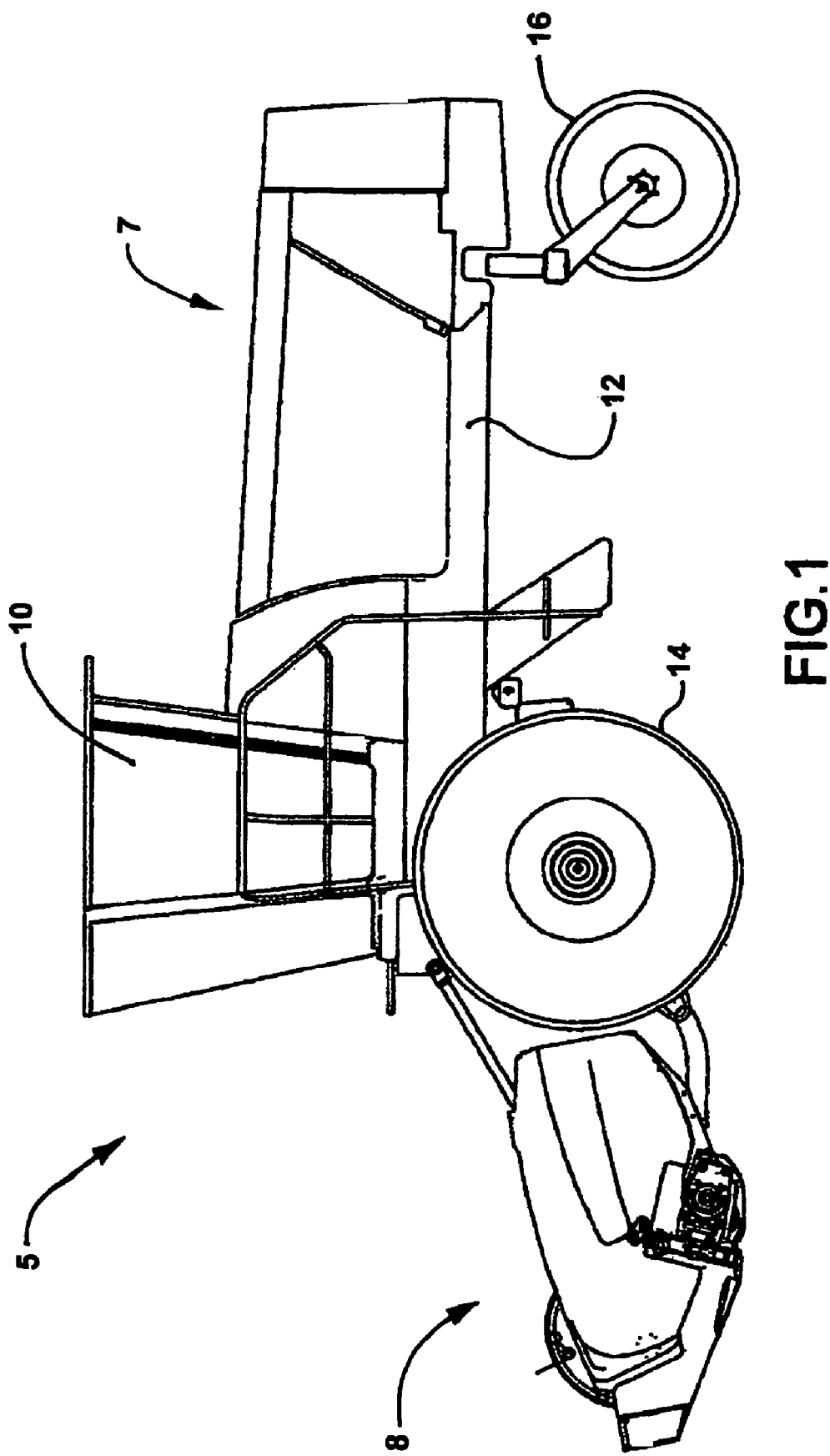
FIG. 1 is a side view of a self-propelled windrower of the type which the instant invention will prove advantageous.

FIG. 1 shows the primary components of a typical and generally well known self-propelled agricultural windrower 5, namely a tractor 7 and a header 8. Tractor 7 has a main frame 12, that is supported by a pair of drive wheels 14 (only one shown) and a pair of rear wheels 16 adjacent to the rear end. A cab 10 encloses the operator's platform to provide an environmentally controlled location from which the windrower can be comfortably operated. While an agricultural windrower is shown in FIG. 1, the present invention is well suited for application in many agricultural and construction vehicles, including but not limited to, tractors, combines, wheel loaders, tractor-loader-backhoes, graders, log skidders, and the like.

Figure 2:
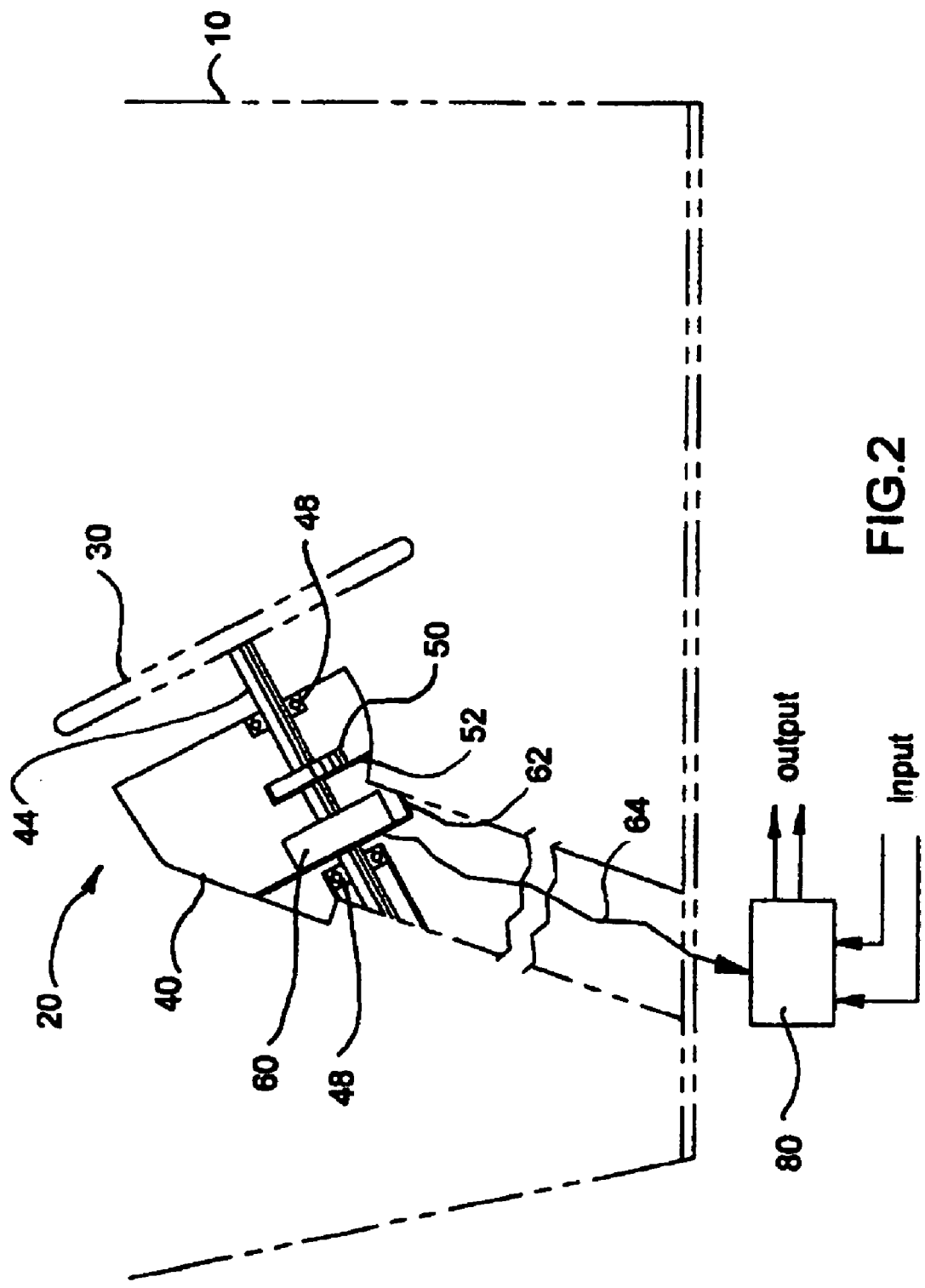
FIG. 2 is a partial side view of an operator's cab and steering system from a self-propelled windrower showing the preferred embodiment of the present invention.

Referring to FIG. 2, a side view of cab 10 is partially depicted in phantom. A portion of the vehicle steering system 20 is shown to include a conventional steering wheel 30 and console 40 inside the cab 10. The cab would, or course, include additional components (not shown) such as a seat, electrical and mechanical controls for operation of the vehicle, and the like. The steering wheel is attached to one end of steering shaft 44 which is selectively rotatable in opposing directions. Steering shaft 44 is supported in the console by bearings 48 arranged to limit motion of the steering shaft to one axis, that is rotation about the longitudinal shaft axis. Bearings are well known in the art and are not described in further detail. The distal end of the steering shaft is interconnected to rotary damper 50 and steering input sensor 60. The steering input sensor is of any type suitable for sensing the angular position of the steering shaft and producing an electrical output signal suitable for the vehicle steer-by-wire system. The steering input sensor is held stationary relative to the vehicle by mounting bracket 62. Rotational movement in the steering wheel is thus transferred to the steering input sensor. The output from steering input sensor 60 is communicated to a steer-by-wire controller 80 by connectors 64. The controller receives input from the steering input sensor as well as other inputs, including inputs from the vehicle steered wheels, and directs outputs to a steering apparatus which causes movement in the steered wheels thereby controlling the direction of vehicle travel. Typical steer-by-wire systems include a programmable controller receiving inputs from a variety of input sensors and directing outputs to a variety of actuators or servos based on the inputs. Interconnection of the components is typically by electrical signal conductor, but pneumatic and hydraulic control may also be used.

The rotary damper 50 is shown in FIG. 2 axially connected to the steering shaft immediately above the input sensor; however, the rotary damper may be positioned at any location along the steering shaft and the relative locations of the rotary damper and the input sensor may be reversed with equally suitable functional results. The rotary damper includes an outer housing (56 in FIGS. 3-5) to protect and enclose the working components and an input structure (54 in FIGS. 3-5) that allow relative rotational movement between the two. The rotary damper contains a viscous fluid that produces a damping force based on relative rotation between the outer housing and the input structure. Greater rotational rates in the steering wheel result in larger resistive forces being applied. A vehicle operator will encounter larger resistance (feel) in the steering wheel when attempting to turn the steering wheel faster compared to the feedback at slower turning inputs. A viscous damper is preferred since it is not subject to large differences between static and dynamic friction inherent in friction brake resistance systems. The force required to initiate steering wheel movement is similar to the force required to continue steering wheel movement when a viscous damper is used. A viscous damper also provides smooth transitions in the force required to initiate movement, continue movement, and stop steering wheel movement greatly enhancing operator feel. The outer housing of the damper is generally interconnected with a fixed structure to prevent rotation. In the present invention, anchor structure 52 affixes the outer structure of the damper to the console thereby preventing rotational movement. The steering shaft is interconnected to the damper input structure in a manner that enables the steering shaft and the input structure to rotate together so that the damping forces created by the damper are applied to the steering shaft. One such suitable damper is disclosed in U.S. Pat. No. 4,432,254.

Referring now to FIG. 3, the steering resistance system is shown to include steering wheel 30, steering shaft 44, bearings 48, rotary damper 50, and steering input sensor 60. Details of damper 50 are also depicted, including the damper outer housing 56 interconnected to the console by damper anchor 52, and input structure 54 as it is interconnected with the steering shaft 44. The components shown are as they would be located in the console (not shown) proximate to the steering wheel 30. This preferred embodiment is simple and compact in construction allowing placement within the console, providing an economically advantageous, simplified steering console. In lieu of the mechanical linkage from the steering wheel to the lower end of the console, wires conduct the steering signals through the console to the steering apparatus located elsewhere in the vehicle. Also shown is input structure 54 and outer housing 56 of the rotary damper and the axial connection of steering shaft 44 to the input structure.

FIG. 4 shows first alternate embodiment of the invention in which rotary damper 50 is located on secondary shaft 71 and interconnected with the steering shaft by motion transfer mechanism 70. The secondary shaft allows alternative locations for the rotary damper providing additional flexibility in console design. Though shown positioned on the steering shaft, steering input sensor 60 could also be located on the secondary shaft should console space limitations so demand. The interconnection of the rotary damper to the secondary shaft is the same as previously described for interconnecting directly with the steering shaft. Motion transfer mechanism 70 in this embodiment includes transfer wheels 72, one located on the steering and secondary shafts. Rotational movement of the steering shaft is transferred to the secondary shaft by force transfer apparatus 74 so that rotating steering wheel 30 results in generally proportional rotation of the secondary shaft resulting in rotation of input structure 54 of the rotary damper which causes rotational resistance to be applied to the steering system. Motion transfer mechanism can be any embodiment capable of transferring rotational motion. Transfer wheels 72 and force transfer apparatus 74 may include pulleys and a belt, sprockets and a chain, or other conventional elements for transferring rotational motion between the steering and secondary shafts. Though shown parallel to steering shaft 44, secondary shaft 71 may be oriented along various axes as is within the capability of the transfer wheels 72 and force transfer apparatus 74 to transfer the rotational movement.

Figure 5:
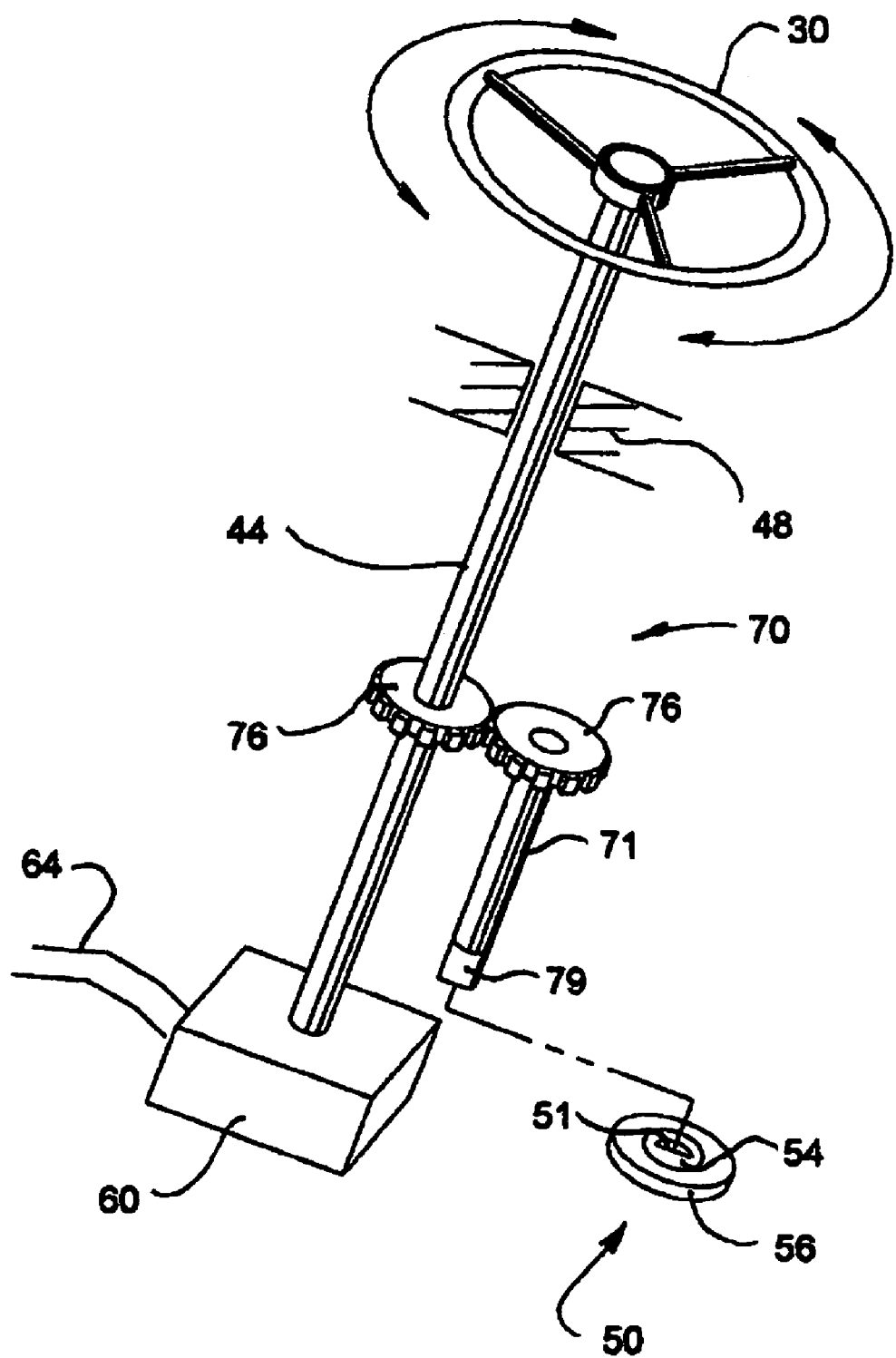
FIG. 5 is an exploded partial schematic view of a vehicle steering system of the instant invention showing yet another alternate embodiment.

A second alternate embodiment of the present invention is shown in FIG. 5. Motion transfer mechanism 70 in this embodiment comprises secondary shaft 71 and a pair of gears 76 that mesh to cause the steering shaft and secondary shaft to rotate simultaneously. While spur gears are shown which require the shafts to be located along parallel axes, other gear types, such as bevel gears, are envisioned in this invention and provide additional design flexibility in the console. As with the embodiment shown in FIG. 4, rotary damper 50 is interconnected to the secondary shaft as previously described so that resistance from the damper is transmitted to the steering wheel in response to input motion. All embodiments in which the rotary damper is connected to a secondary shaft may rely on mechanisms that cause the secondary shaft to rotate generally proportional to the steering shaft. Variations in the rotational drive ratio between the steering secondary shafts and variations in the damping characteristics of the rotary damper allow the resistance sensed at the vehicle steering to be altered to produce the desired operator feel.

Also shown in FIG. 5 is a detail view of the interconnection between steering shaft 44 and rotary damper 50. The interconnection comprises input structure 56 having a receiving structure 51 that is configured to mate with an interface structure 79 on the end of secondary shaft 71 (or steering shaft 44 in other embodiments) so that no relative rotational motion occurs between the input structure and the shaft. As shown, receiving structure 51 is configured to accept a D-shaft; interface structure 79 is a D-shaped shaft end that fits into the receiving structure in a way that causes the shaft and input structure to rotate in unison. Numerous other functionally equivalent and commonly known interconnection methods are possible, including interference fit, splines, keys and keyways.

Figure 6:
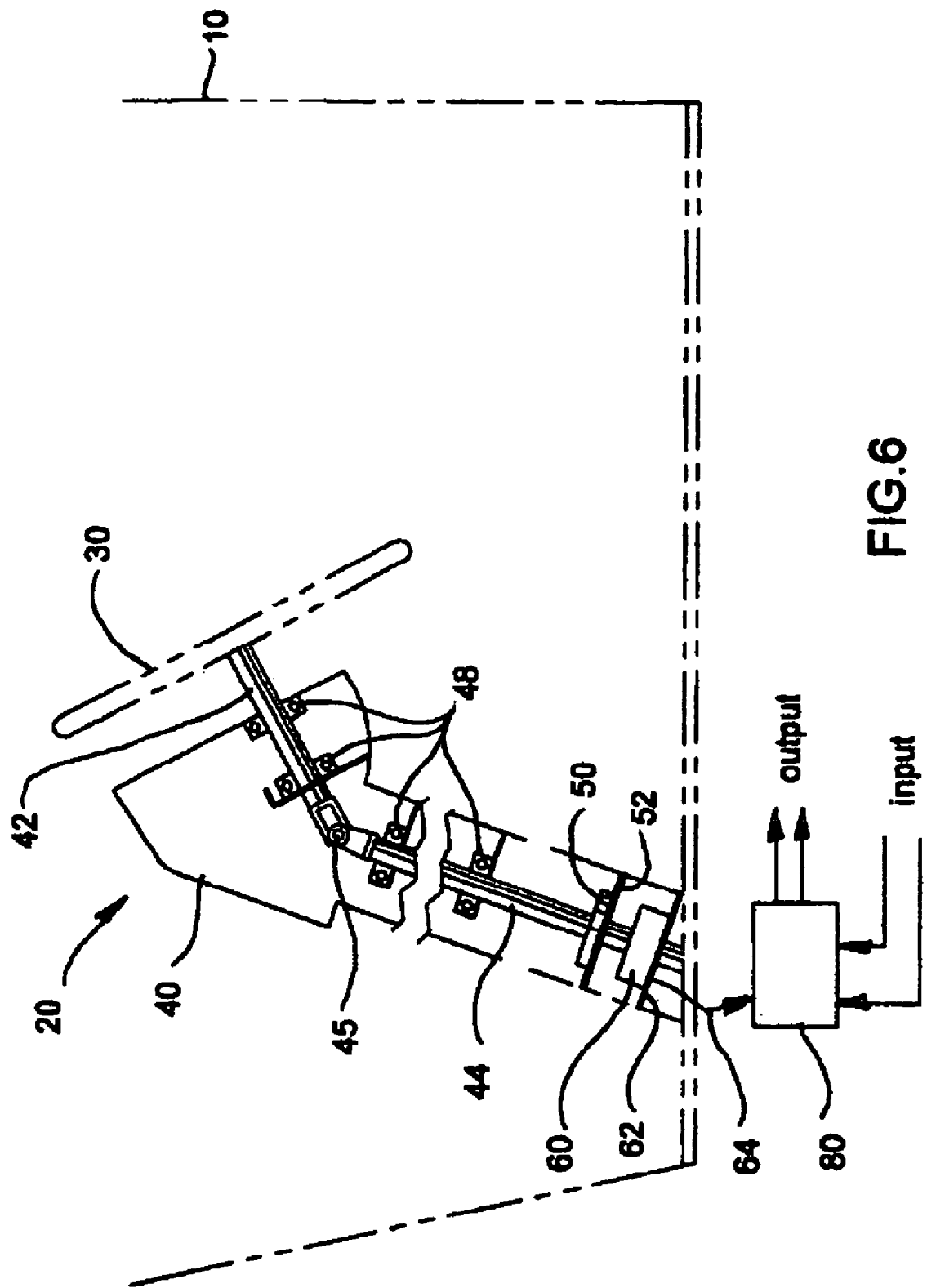
FIG. 6 is a partial side view of a typical vehicle steering system of the instant invention showing still another alternate embodiment.

FIG. 6 shows a third alternate embodiment of the present invention. In this embodiment, steering wheel 30 is attached to a stub shaft 42 that is interconnected to one end of steering shaft 44 by universal connector 45. The universal connector is well known in the art as a mechanism to transmit rotational movement between two shafts that are not necessarily in axial alignment. Stub shaft 42 and steering shaft 44 are supported in the console by bearings 48 arranged to limit motion of the shafts to rotation about the longitudinal shaft axis. Rotary damper 50 and steering input sensor 60 are interconnected to the steering shaft in any of the previously described manners and may be positioned at any point along the steering shaft as console space allows. Rotational movement in the steering wheel causes generally equal rotational motion in steering shaft 44 which is thereby transferred to the steering input sensor 60 and input structure 54 of the rotary damper. Output from the steering input sensor is communicated to a steering apparatus which causes movement in the steered wheels thereby changing the direction of vehicle travel.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. A damping system for a steer-by-wire vehicle steering system comprising:
   a steering wheel mounted for selective rotation in first and second opposing directions;
   an elongate steering shaft having an axis of rotation and first and second opposing ends spaced along said axis of rotation, said steering shaft supported on the vehicle for rotation about said axis of rotation;
   said first end of said steering shaft and said steering wheel interconnected such that selective rotation of said steering wheel causes a generally equal rotation of said steering shaft about said axis of rotation;
   an input sensor for the vehicle steering system supported on the vehicle relative to said steering shaft such that rotation of said steering shaft is detected by said input sensor, sending a signal to the steering system of the vehicle;
   a rotary damper supported on the vehicle and including a rotating structure to dampen rotary input forces transmitted thereto; and
   a connecting structure interconnecting said steering shaft and said rotating structure such that rotation forces applied to said steering shaft are transmitted to said rotating structure, applying a resistance to said rotation forces; and
   wherein said connecting structure comprises a first gear connected to said steering shaft, a secondary shaft, and a second gear connected to said secondary shaft, said secondary shaft further being connected to said rotating structure, with said first and second gears intermeshing to cause steering shaft rotation to be transferred to said secondary shaft in a manner to cause generally proportional rotation of said rotating structure of said rotary damper.

2. The damping system of claim 1, wherein said rotary damper is a viscous damper.

3. A damping system for a steer-by-wire vehicle steering system comprising:
   a steering wheel mounted for selective rotation in first and second opposing directions;
   an elongate steering shaft having an axis of rotation and first and second opposing ends spaced along said axis of rotation, said steering shaft supported on the vehicle for rotation about said axis of rotation;
   said first end of said steering shaft and said steering wheel interconnected such that selective rotation of said steering wheel causes a generally equal rotation of said steering shaft about said axis of rotation;
   an input sensor for the vehicle steering system supported on the vehicle relative to said steering shaft such that rotation of said steering shaft is detected by said input sensor, sending a signal to the steering system of the vehicle;
   a rotary damper supported on the vehicle and including a rotating structure to dampen rotary input forces transmitted thereto;
   a connecting structure interconnecting said steering shaft and said rotating structure such that rotation forces applied to said steering shaft are transmitted to said rotating structure, applying a resistance to said rotation forces; and wherein said connecting structure comprises a first transfer wheel connected to said steering shaft, a secondary shaft, and a second transfer wheel connected to said secondary shaft, said secondary shaft further being connected to said rotating structure, said transfer wheels being interconnected by a force transfer apparatus that causes steering shaft rotation to be transferred to said secondary shaft in manner to cause generally proportional rotation of said rotating structure of said rotary damper.

4. The damping system of claim 1, wherein said first and second transfer wheels are sprockets and said force transfer apparatus is a chain.

5. The damping system of claim 1, wherein said first and second transfer wheels are pulleys and said force transfer apparatus is a belt.

6. The damping system of claim 1, wherein the interconnection between said steering shaft and said steering wheel comprises a stub shaft and a universal connector.

7. The damping system of claim 6, wherein said rotary damper is a viscous damper.

8. In an agricultural windrower having a steering system for controlling the direction of travel of said windrower, the improvement in said steering system comprising:

a steering wheel mounted for selective rotation in first and second opposing directions, an elongate steering shaft having an axis of rotation and first and second opposing ends spaced along said axis of rotation, said steering shaft supported on the windrower for rotation about said axis of rotation;

said first end of said steering shaft and said steering wheel interconnected such that selective rotation of said steering wheel causes a generally equal rotation of said steering shaft about said axis of rotation;

an input sensor for the vehicle steering system supported on the windrower relative to said steering shaft such that rotation of said steering shaft is detected by said input sensor, sending a signal to the steering system of the windrower;

a rotary damper supported on the windrower and including a rotating structure to dampen rotary input forces transmitted thereto; and a connecting structure interconnecting said steering shaft and said rotating structure such that rotation forces applied to said steering shaft are transmitted to said rotating structure, applying a resistance to said rotation forces the connecting structure comprising a first gear connected to said steering shaft, a secondary shaft, and a second gear connected to said secondary shaft, said secondary shaft further being connected to said rotating structure, with said first and second gears intermeshing to cause steering shaft rotation to be transferred to said secondary shaft in a manner to cause generally proportional rotation of said rotating structure of said rotary damper.

* * * * *